(12) United States Patent
Wehninck et al.

(10) Patent No.: US 11,407,372 B2
(45) Date of Patent: Aug. 9, 2022

(54) AIRBAG FLAP

(71) Applicant: K.L. KASCHIER-UND LAMINIER GMBH, Bad Bentheim-Gildehaus (DE)

(72) Inventors: Rembert Schulze Wehninck, Tutzing (DE); Albert Roring, Gronau-Epe (DE)

(73) Assignee: K.L. KASCHIER -UND LAMINIER GMBH, Bad Bentheim Gildehaus (DE)

( * ) Notice: Subject to any disclaimer, the term of this patent is extended or adjusted under 35 U.S.C. 154(b) by 0 days.

(21) Appl. No.: 16/643,869

(22) PCT Filed: May 17, 2019

(86) PCT No.: PCT/EP2019/000153
§ 371 (c)(1),
(2) Date: Mar. 26, 2020

(87) PCT Pub. No.: WO2020/038596
PCT Pub. Date: Feb. 27, 2020

(65) Prior Publication Data
US 2021/0354651 A1    Nov. 18, 2021

(30) Foreign Application Priority Data

Aug. 24, 2018 (DE) .......................... 102018006704.2

(51) Int. Cl.
*B60R 21/215* (2011.01)

(52) U.S. Cl.
CPC .. *B60R 21/215* (2013.01); *B60R 2021/21537* (2013.01)

(58) Field of Classification Search
CPC .................... B60R 21/215; B60R 2021/21537
See application file for complete search history.

(56) References Cited

U.S. PATENT DOCUMENTS

| 8,348,303 | B1 | 1/2013 | Roring | |
|---|---|---|---|---|
| 10,160,415 | B2 | 12/2018 | Choi | |
| 2010/0078920 | A1* | 4/2010 | Terai | ..................... B60R 21/215 280/728.3 |

(Continued)

FOREIGN PATENT DOCUMENTS

| CN | 111295312 A | * | 6/2020 | ........... B60R 21/215 |
| DE | 10352566 A1 | * | 6/2005 | ......... B60R 21/2165 |

(Continued)

*Primary Examiner* — Barry Gooden, Jr.
(74) *Attorney, Agent, or Firm* — Andrew Wilford

(57) ABSTRACT

The invention relates to an airbag flap covering the mouth of an airbag receptacle, wherein an airbag outer cover overlies the airbag flap and the airbag flap is connected via a hinge element to a flap support wall in a molded manner, which is in turn secured to the airbag outer covering and/or to a wall of the receptacle, wherein the airbag flap and the flap support wall consist of the same flat plastic, in particular a composite material, wherein a direction-fin-guiding structure, in the form of numerous slits and/or openings, is provided in the flat plastic, in particular in the composite material, in the region of the hinge element and/or to one or both sides of the hinge element, in the flat plastic, in particular in the composite material, and thereby creates at least one stretch region in the material in the direction in which the airbag flap moves outward through the airbag cushion.

6 Claims, 2 Drawing Sheets

(56) References Cited

U.S. PATENT DOCUMENTS

| | | | |
|---|---|---|---|
| 2014/0117649 A1 | 5/2014 | Hoeing | |
| 2014/0120285 A1* | 5/2014 | Hoeing | ................... B32B 27/32 |
| | | | 428/36.1 |
| 2016/0023625 A1 | 1/2016 | Roring | |
| 2018/0001858 A1* | 1/2018 | Hoeing | ................... B32B 27/32 |
| 2018/0099633 A1* | 4/2018 | Choi | ..................... B60R 21/215 |
| 2021/0016738 A1* | 1/2021 | An | ........................ B60R 21/215 |

FOREIGN PATENT DOCUMENTS

| | | | |
|---|---|---|---|
| DE | 102001010643 A | 10/2005 | |
| DE | 102004010643 A | 10/2005 | |
| WO | WO-2015139803 A1 * | 9/2015 | ........... B60R 21/215 |
| WO | WO-2020038594 A1 * | 2/2020 | ........... B60R 21/215 |

* cited by examiner

AIRBAG FLAP

CROSS REFERENCE TO RELATED APPLICATIONS

This application is the US-national stage of PCT application PCT/EP2019/000153 filed 17 May 2019 and claiming the priority of German patent application 102018006704.2 itself filed 24 Aug. 2019.

FIELD OF THE INVENTION

The invention relates to an airbag flap covering the mouth of an airbag receptacle.

BACKGROUND OF THE INVENTION

An airbag outer cover typically overlies the airbag flap, and the airbag flap is connected in an integral manner by a hinge element to a flap support wall fastened to the airbag outer cover and/or to a wall of the receptacle, the airbag flap and the flap support wall consisting of the same flat plastic, in particular composite material.

An airbag assembly of this kind is known from EP 2 727 775 [US 2014/0117649]. The airbag flap is connected to the flap support wall extending into the receptacle, by a fold, in order to provide an additional path for the airbag flap when the airbag cushion emerges through the airbag mouth.

OBJECT OF THE INVENTION

The object of the invention is to provide a path-clearing technique for an airbag flap that is simple in terms of design and production, and requires little space.

SUMMARY OF THE INVENTION

This object is achieved according to the invention in that a yield structure in the form of a plurality of slots and/or openings is provided in the region of the hinge element and/or to one or both sides of the hinge element, in the flat plastic, in particular in the composite material, and as a result provides at least one stretch region in the material, in the direction in which the airbag flap is moved outward by the airbag cushion.

In this case, the slots or openings are punchouts, cuts or punched cuts.

The slots and/or openings made in the flat plastic in the region of or close to the hinge element of the airbag flap render the flat material stretchable when tensile forces act on the airbag flap when the airbag cushion deploys. The flat material is therefore in the cut/stamped state as long as the airbag is not triggered. Only after triggering of the airbag does the material stretch in a path-clearing manner to form openings.

In this case, it is particularly advantageous for the cut/stamped flat material to have small outside dimensions in the unstretched state, and thus to be space-saving. It is also simple and cost-effective to make.

The type, orientation, density and size of the slots and/or openings make it possible to exactly determine what additional distance(s) should be provided at what forces. Stretching the yield structure results in a grid structure, in particular with lozenge-shaped holes.

It is preferably proposed that the airbag flap and the flap support wall consist of a composite material comprising at least one layer of plastic tapes or fibers, in particular consisting of thermoplastic polypropylene or polyester, and at least one plastic layer melted thereon. In this case, the plastic tapes or fibers can form a woven fabric.

BRIEF DESCRIPTION OF THE DRAWING

Embodiments of the invention are shown schematically in the drawings and will be described in greater detail in the following. In the drawings.

SPECIFIC DESCRIPTION OF THE INVENTION

Figure 1:
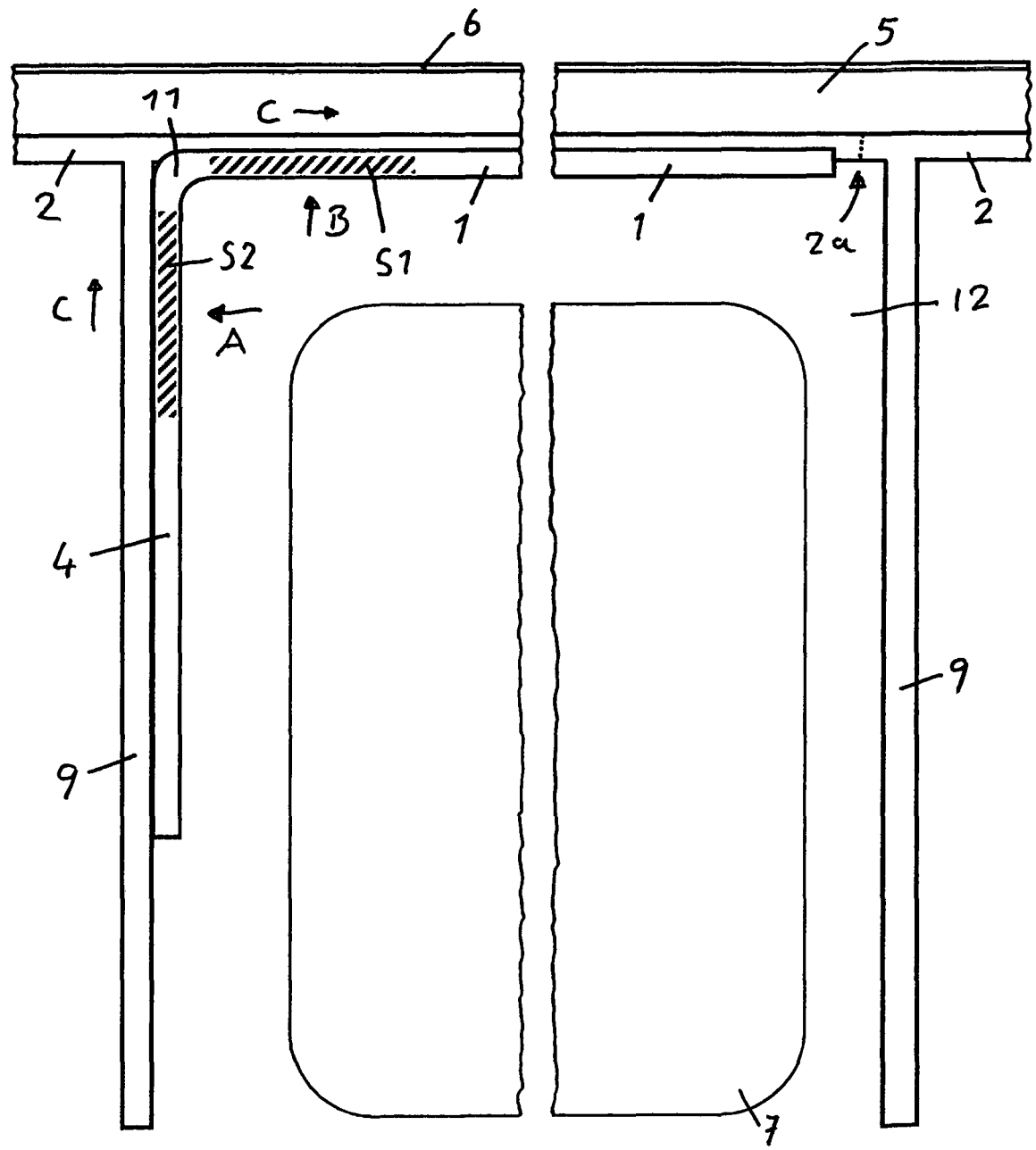
FIG. 1 is a cross section through an airbag unit.
Figure 2:
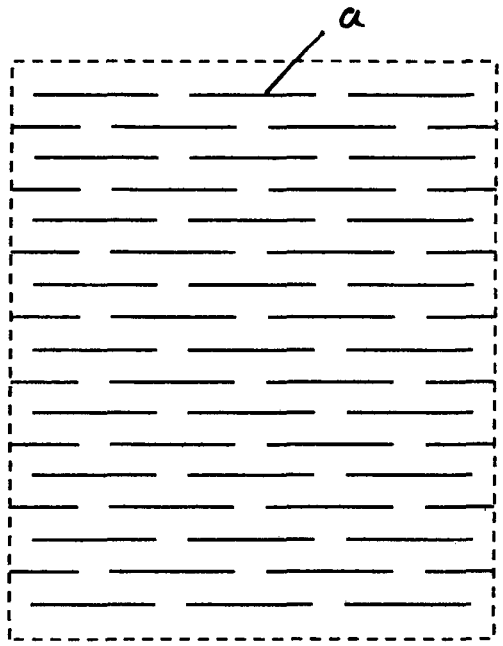
FIGS. 2 to 5 are views of the yield structure in the viewing direction according to the arrow A and B in FIG. 1 when not stretched.
Figure 3:
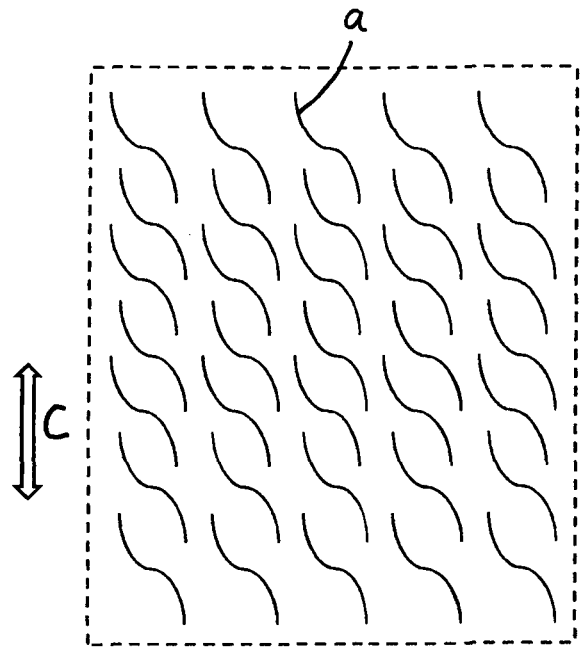
Figure 4:
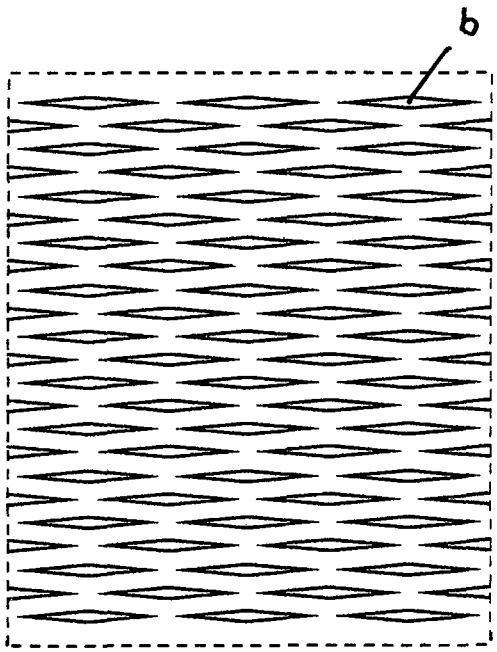
Figure 5:
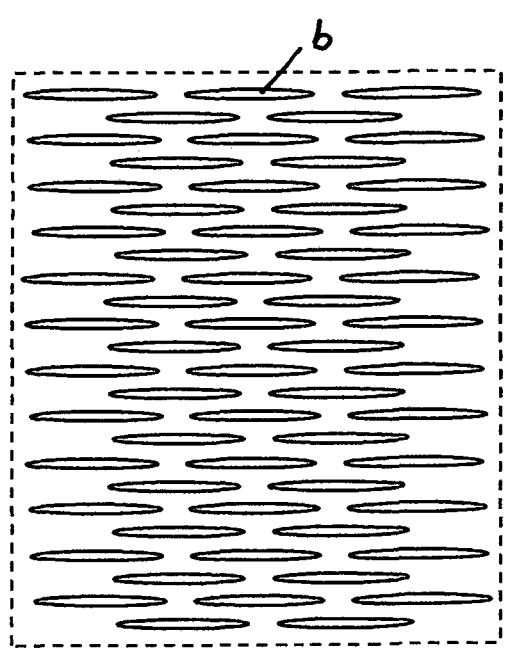

The airbag assembly comprises a receptacle 12 that receives an airbag 7, is surrounded by walls 9, and is closed by a cover 2 that has the predetermined breakaway lines 2a. The cover 2 forms an airbag mouth when, after the airbag 7 has been triggered, the cover 2 ruptures at the predetermined breakaway lines and folds outward. In this case, the flap formed by the cover 2 is fastened to the remaining cover by an edge that forms a hinge 11.

The cover 2 is externally covered by a foam layer 5 on whose outer face a decorative surface material 6 is laid.

At least one airbag flap 1 is fastened to the lower face of the cover 2 that is molded onto the airbag flap 1. The material of the airbag flap 1 and the production method are described in EP 2 727 775.

As shown in FIG. 1, the airbag mouth is closed by a single airbag flap 1 that comprises the hinge element 11. However, it is also possible that two airbag flaps may be provided with hinge elements on opposite sides. The airbag flap(s) is/are in each case integrally formed on a flap support wall 4 by the hinge element 11, which flap support wall extends into the interior of the receptacle 12. In this case, the flap support wall 4 is fastened to the inner surface of the receptacle wall 9.

The airbag flap 1 and/or the flap support wall 4 integrally molded onto the airbag flaps comprises/comprise at least one horizontal structure S1 and/or S2, in the flat plastic, in particular in the composite material, close to the hinge/hinge element 11 and/or in the hinge region. For this purpose, cuts a and/or openings/holes b are cut or stamped, in a regular arrangement and at regular spacings, in the flat material of the airbag flaps 1 and/or of the flap support wall 4 and/or in the region of the hinge 11, as is shown for example in FIG. 2 to 5, in the unstretched state.

Thus, if the airbag unit is triggered, while its bag is deployed it pushes against the airbag flap(s) that pivots/pivot outwards, tensile forces arising on the airbag flap(s) and often also on the flap support wall 4, in the surface plane, in the arrow direction C, which forces stretch the material in the direction C, extension of the material in the arrow direction C being made possible by the cuts a spreading to form openings, and the openings/holes b enlarging to form a grid structure, in particular with lozenge-shaped holes, resulting in the plastic, in particular in the plastic composite material.

The airbag flap 1 and the flap support wall 4 consist of composite material comprising at least one layer of plastic tapes or fibers, in particular consisting of thermoplastic polypropylene or polyester, and at least one plastic layer melted thereon. In this case, the plastic tapes or fibers form a woven fabric.

The invention claimed is:

1. In combination with an airbag receptacle having a mouth:
    an airbag flap covering the mouth of the airbag receptacle,
    an airbag outer cover overlying the airbag flap,
    a hinge element connecting the airbag flap in an integral manner to a flap support wall fastened to the airbag outer cover and/or to a wall of the receptacle, the airbag flap and the flap support wall consisting of a same flat plastic material, and
    a yield structure in the form of a plurality of punchouts, cuts, or punched cuts provided in a region of the hinge element and/or to one or both sides of the hinge element in the flat plastic material and forming in the flat plastic material at least one stretch region stretchable in a direction in which the airbag flap is moved outward by an airbag cushion.

2. The combination according to claim 1, wherein a grid structure results from stretching the yield structure.

3. The combination according to claim 1, wherein the flat plastic material is a composite.

4. The combination according to claim 1, wherein the yield structure is constructed so as to form a lozenge structure when stretched.

5. The combination according to claim 1, wherein the airbag flap and the flap support wall consist of a composite material comprising at least one layer of plastic tapes or fibers of thermoplastic polypropylene or polyester, and at least one plastic layer melted thereon.

6. The combination according to claim 5, wherein the plastic tapes or fibers form a woven fabric.

* * * * *